US012656598B2

(12) United States Patent
Cahill et al.

(10) Patent No.: US 12,656,598 B2
(45) Date of Patent: Jun. 16, 2026

(54) OPTICAL FILTER WAVELENGTH TUNING USING RAISED COSINE CONTROL SIGNAL

(71) Applicant: II-VI Delaware, Inc., Wilmington, DE (US)

(72) Inventors: Michael Cahill, Hampton (AU); Glenn Bartolini, Lexington, MA (US); Hui Guo, Shanghai (CN)

(73) Assignee: II-VI DELAWARE, INC., Wilmington, DE (US)

( * ) Notice: Subject to any disclaimer, the term of this patent is extended or adjusted under 35 U.S.C. 154(b) by 396 days.

(21) Appl. No.: 18/216,928

(22) Filed: Jun. 30, 2023

(65) Prior Publication Data

US 2025/0004268 A1    Jan. 2, 2025

(51) Int. Cl.
*G02B 26/02*        (2006.01)
*G02B 26/08*        (2006.01)

(52) U.S. Cl.
CPC ............................... *G02B 26/0833* (2013.01)

(58) Field of Classification Search
CPC ........ G02B 26/0833; G09G 3/346; G02F 1/35
See application file for complete search history.

(56) References Cited

U.S. PATENT DOCUMENTS

| | | | |
|---|---|---|---|
| 4,198,162 A | 4/1980 | Bjorklund et al. | |
| 6,057,818 A | 5/2000 | Cole | |
| 6,999,639 B2 | 2/2006 | Tsarev | |
| 7,024,072 B2 | 4/2006 | Chen et al. | |
| 10,381,797 B1 | 8/2019 | Ryba et al. | |
| 10,539,780 B2 | 1/2020 | Lemaire et al. | |
| 10,684,465 B2 | 6/2020 | Kinstlich et al. | |
| 10,802,221 B1 | 10/2020 | Murano et al. | |
| 2013/0050697 A1 | 2/2013 | Colbourne et al. | |
| 2014/0063488 A1* | 3/2014 | Adler ................. | G01B 9/02067 356/51 |
| 2014/0209795 A1 | 7/2014 | Hsieh | |
| 2022/0411255 A1 | 12/2022 | Pernu | |

FOREIGN PATENT DOCUMENTS

| | | |
|---|---|---|
| EP | 1 701 580 | 9/2006 |

* cited by examiner

*Primary Examiner* — Euncha P Cherry
(74) *Attorney, Agent, or Firm* — McAndrews, Held & Malloy, Ltd.

(57)                ABSTRACT

A raised cosine waveform is used for the drive signal input to an optical device that exhibits a nonlinear time domain response (e.g., tunable optical filter). The raised cosine waveform (either current or voltage) exhibits significantly fewer high frequency components than conventional drive signals and, as a result, reduces the oscillatory movements of the device as it is settling into a target position. In the specific example of a MEMS tilt mirror as used to tune a nonlinear optical filter, the raised cosine drive signal allows for the tilt mirror to quickly settle into a new position and avoid the prolonged oscillatory motion known to limit the responsivity of prior art tunable optical filters.

12 Claims, 6 Drawing Sheets

FIG. 9

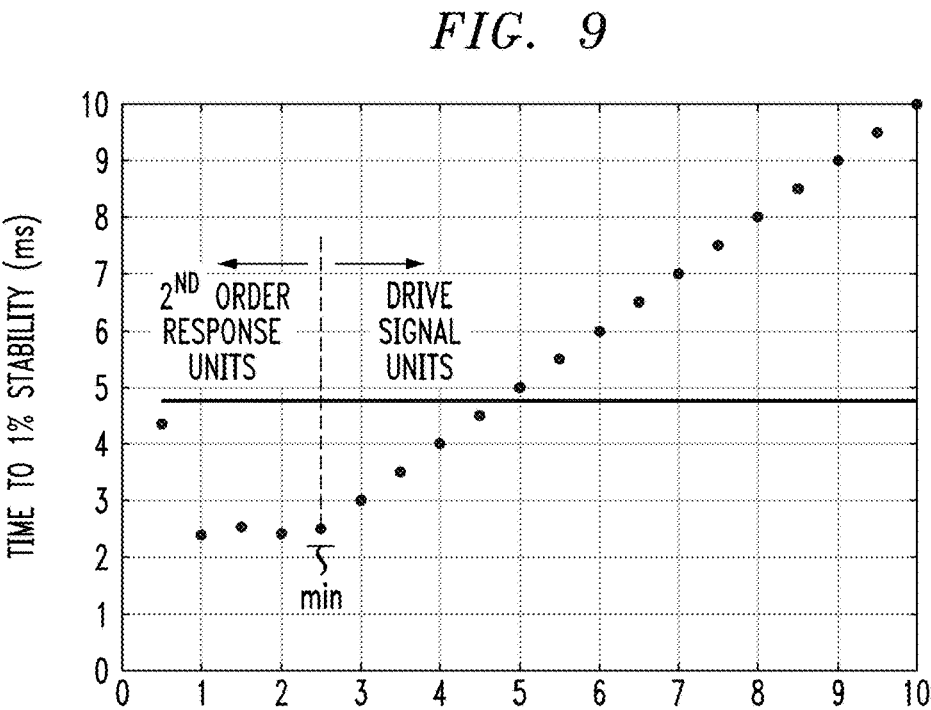

FIG. 10

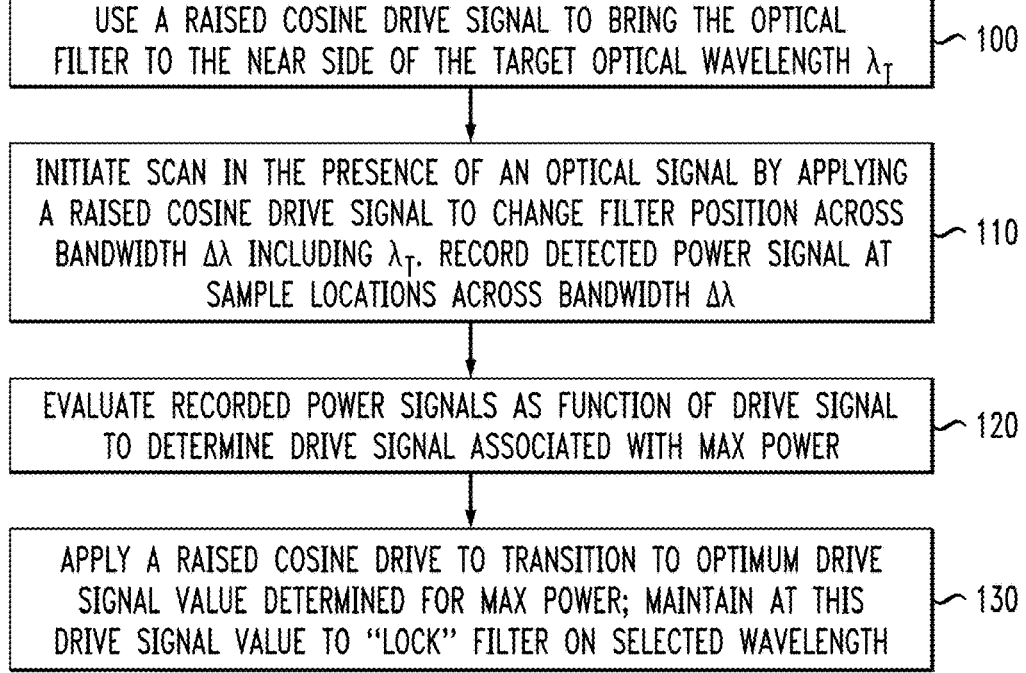

USE A RAISED COSINE DRIVE SIGNAL TO BRING THE OPTICAL FILTER TO THE NEAR SIDE OF THE TARGET OPTICAL WAVELENGTH $\lambda_T$ — 100

INITIATE SCAN IN THE PRESENCE OF AN OPTICAL SIGNAL BY APPLYING A RAISED COSINE DRIVE SIGNAL TO CHANGE FILTER POSITION ACROSS BANDWIDTH $\Delta\lambda$ INCLUDING $\lambda_T$. RECORD DETECTED POWER SIGNAL AT SAMPLE LOCATIONS ACROSS BANDWIDTH $\Delta\lambda$ — 110

EVALUATE RECORDED POWER SIGNALS AS FUNCTION OF DRIVE SIGNAL TO DETERMINE DRIVE SIGNAL ASSOCIATED WITH MAX POWER — 120

APPLY A RAISED COSINE DRIVE TO TRANSITION TO OPTIMUM DRIVE SIGNAL VALUE DETERMINED FOR MAX POWER; MAINTAIN AT THIS DRIVE SIGNAL VALUE TO "LOCK" FILTER ON SELECTED WAVELENGTH — 130

OPTICAL FILTER WAVELENGTH TUNING USING RAISED COSINE CONTROL SIGNAL

TECHNICAL FIELD

Disclosed herein is control system for providing wavelength tuning and locking of a tunable optical filter with respect to an input signal applied thereto.

BACKGROUND

Many of today's optical filters are configured to provide the capability to adjust (tune) the wavelength(s) that are permitted to pass through the filtering element. Besides being able to tune the optical filter to select a particular wavelength value, another desired feature is to maintain the stability of the selected wavelength. That is, there is a need to avoid any kind of drifting or shift of the selected wavelength over time. Tunable optical filters may include a feedback loop that monitors the output and adjusts the filter parameters to provide locking of the output wavelength.

While many different arrangements may be used to provide the tuning and locking functions for an optical filter, a common arrangement is based on the use of a micro-electrical mechanical system (MEMS) tilt mirror. In the MEMS tilt mirror arrangement, an electrical control signal (current or voltage) is applied to the tilt mirror structure in a manner that adjusts the angular position of the mirror to change the specific wavelength of the output signal. A known problem with conventional MEMS tilt mirrors is that the time-domain response of the mirror element with respect to the applied control signal is nonlinear. That is, the movement of the mirror itself displays under-damped oscillations for a period of time before settling down into the desired "new" tilt angle with respect to an incoming optical signal.

This nonlinear, oscillatory response inevitably limits the speed at which wavelength tuning may be performed, which is particularly problematic when using the tunable optical filter as part of a tune-and-hold device. The nonlinear response also impacts the capability of feedback control to lock the optical filter at a selected wavelength. The control loop typically uses a dither signal that is added to the tilt mirror control signal (the dither typically being step changes or sinusoidal changes), with multiple measurements over time required for locking. The nonlinear time response of the MEMS tilt mirror impacts the size and speed with which these multiple measurements may be performed, which in turn impacts the efficiency of the locking process. Indeed, the nonlinear response time of a MEMS tilt mirror to applied control signals limits the speed and/or stability that can be achieved for both tuning and locking of optical wavelength-selective filters.

Beyond the specific embodiment of a tunable optical filter, there exist other optical devices that exhibit an unwanted nonlinear response to an applied control (stimulus) input signal. Thus, in general, it would be desirable to find a solution that minimizes fluctuations in an optical device's nonlinear response to certain input stimuli.

SUMMARY OF THE DISCLOSURE

It is proposed to address the concerns related to the nonlinear response of certain devices (for example, a MEMS tilt mirror as used in a tunable optical filter) by utilizing a drive signal that minimizes fluctuations in the device's response. In particular, it is proposed to utilize a raised cosine waveform for a drive signal input to a nonlinear device instead of prior art step function drive signals (or perhaps a ramp-based drive signal). The raised cosine waveform (either current or voltage) exhibits significantly fewer high frequency components than the conventional drive signals and, as a result, reduces the oscillatory movements of the device. In the specific example of a MEMS tilt mirror as used to tune a nonlinear optical filter, the raised cosine drive signal allows for the tilt mirror to quickly settle into a new position and avoid the prolonged oscillatory motion known to limit the responsivity of the prior art.

In an example embodiment, a raised cosine signal is used as a drive signal for adjusting the position of a MEMS tilt mirror from an initial position (associated with a previously-selected wavelength value) to an updated position (associated with a newly-selected wavelength value). The rise time of the raised cosine waveform may be selected to achieve optimum performance for a given filter response, or as required for a particular application. The tunable optical filter itself has a second-harmonic transfer function, with the damping coefficient $\zeta$ associated with the rise time of the raised cosine. Values may range, for example, from 0.01 to 1.00, with a trade-off between stability of the mirror's position and the length of time required for the mirror to arrive at the final location.

Another example embodiment, related to locking a tunable optical filter to an input optical signal operating at a nominal wavelength, utilizes the application of a raised cosine signal to scan across a wavelength range±the nominal value to account for signal wavelength drift or filter wavelength offset (or both). The optimum filter wavelength that achieves maximum output signal power is then identified and another raised cosine drive signal is used to adjust the filter wavelength to the optimum value.

An example may take the form of a tunable filter that is used to filter one selected optical signal from a plurality of (unique) signals, each with their own wavelength defined within a wavelength-division multiplexed grid. The tunable filter can be tuned and locked to the selected optical signal of interest using the previously-described electrical drive signal having a raised cosine waveform, the tuning and locking on the selected optical signal occurring in a relatively short period of time (with respect to the prior art) and with minimal resonance of the filter itself.

Another embodiment may comprise a tunable optical filter including a nonlinear filter component and a control source. The nonlinear filter component is responsive to a multi-wavelength input optical signal and an electrical drive signal, the electrical drive signal for tuning an output wavelength of the tunable optical filter from an initial wavelength value to a selected target wavelength value. The nonlinear filter component exhibits an oscillatory response to the electrical drive signal. The control source is used to provide a raised cosine signal as the electrical drive signal input to the nonlinear filter component, the raised cosine signal exhibiting a defined rise time associated with minimizing the extent of the oscillatory response of the nonlinear filter component.

More generally, an example embodiment may take the form of a switchable optical device comprising an optical component and an associated control source. The optical component is configured to control switching functions between one or more input signals and one or more output signals as a function of an applied electrical control signal. The optical component exhibits a nonlinear response to the applied electrical control signal. The control source is used to provide a raised cosine signal as the electrical control signal input to the optical component, the raised cosine signal exhibiting a defined rise time associated with minimizing fluctuations in the nonlinear response of the component.

Other and further aspects and embodiments of the disclosed arrangement may become apparent during the course of the following discussion and by reference to the accompanying drawings.

BRIEF DESCRIPTION OF THE DRAWINGS

Referring now to the drawings,

FIG. 9 plots the time to stability (defined here as the time taken to get within ±1% of the target value) with respect to the time period of the raised cosine, for a second-order filter;

FIG. 10 is a flowchart of an example set of steps that may be used to perform the tuning and locking process of an optical filter in response to a raised cosine drive signal used to control the filter;

DETAILED DESCRIPTION

Figure 1:
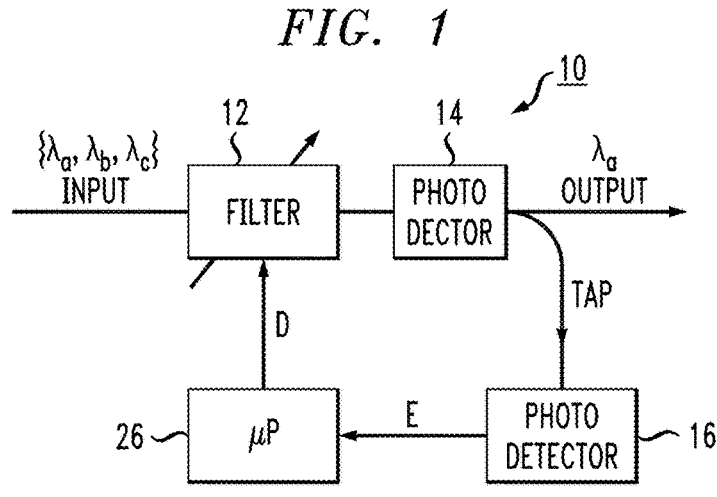
FIG. 1 illustrates one typical application of a tunable optical filter.

FIG. 1 illustrates a two-port tunable optical filter 10, which may be used as an in-line filter in a variety of different optical systems. Optical filter 10 includes a wavelength-tunable element 12 disposed to receive a propagating optical signal (which may be a multi-wavelength signal). Wavelength-tunable element 12 is configured to allow for only a selected wavelength portion of a multi-wavelength signal to pass through (here, illustrated as the optical signal propagating at wavelength $\lambda_a$). An optical tap 14 is positioned at the output of tunable element 12 and used to direct a small portion of the filtered output signal (e.g., no more than 10%, typically closer to 1%) into a photodetector 16. Photodetector 16 converts the optical power of the tapped signal into an electrical equivalent (E), which is applied as an input to a processing module 18 that is used to analyze the properties of the output signal. In particular, processing module 18 determines if tunable element 12 is properly aligned to direct a selected wavelength (for example, $\lambda_a$) into the output signal path, or if adjustment is needed. The control between processing module 18 and tunable element 12 is shown as an electrical drive signal D that module 18 applies to tunable element 12 to adjust its position, as need be, to ensure that the proper selected wavelength appears at the output.

Figure 2:
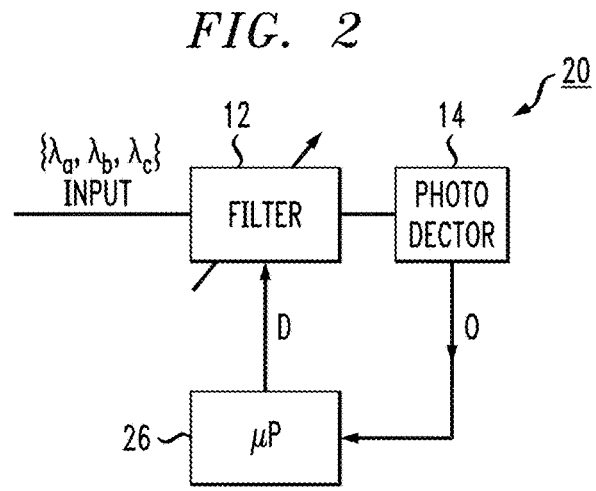
FIG. 2 shows another possible application of the same filter.

FIG. 2 illustrates a terminating type of optical filter 20, which may be suitable for use in a tunable optical receiver. In this configuration, the filtered output from a wavelength tuning element 22 is directly applied as an input to a photodetector 24, with the converted measure of output power applied as an input to a processing module 26 for a similar type of wavelength adjustment control. The same measure can also include information, e.g., digital data, that is not used in the wavelength control function but is part of the monitoring of the optical receiver itself.

As mentioned above, many of the technologies used to provide the wavelength tunability of elements 12, 22 exhibit nonlinear responses in the time domain, where one such technology is based upon the use of a micro-electrical mechanical system (MEMS) to control the angular position of a mirror that is used to re-direct an incoming optical beam.

Figure 3:
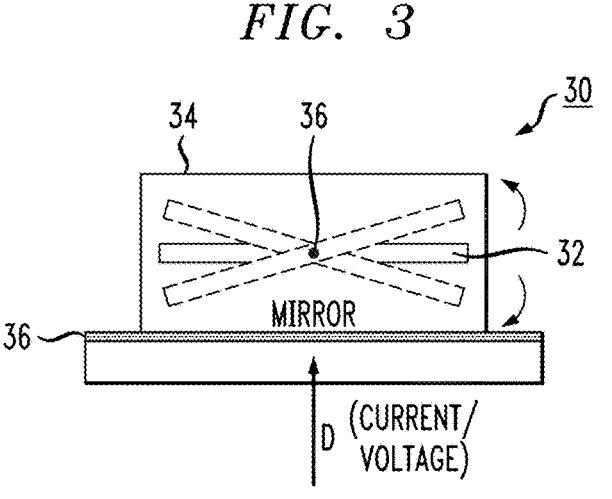
FIG. 3 is a simplified diagram of a MEMS tilt mirror that is controlled via an applied electrical drive signal (here, a voltage signal)

FIG. 3 is a simplified diagram of a MEMS tilt mirror element 30 that may be used for adjusting the selected output wavelength from a multi-wavelength input. Element 30 is shown as including a mirrored component 32 that is typically suspended within a housing 34 between a pair of torsion bars 36. An electrical drive signal is applied to a substrate supporting mirrored component 32 in a manner that creates a torque on torsion bars 36 and rotates mirror 32. The magnitude of the drive signal is directly related to the torque and the resultant angular movement of mirrored component 32. The change in tilt angle (exaggerated for explanatory purposes), as controlled by the applied drive signal, is also shown in FIG. 3.

The time domain response for a tunable optical filter based upon a nonlinear component such as MEMS tilt mirror 30 can be describes as a highly under-damped second-order oscillator, with the following transfer function:

$$H(\omega) = \frac{1}{1 + 2j\omega\zeta - \omega^2},$$

where $\zeta$ is the damping factor (with smaller values of $\zeta$ resulting in a higher resonance peak of the oscillator). More generally, there exist various types of devices beyond tunable optical filters with a similar second-order nonlinear response that may benefit by the use of a drive (control/ stimulus) signal that minimizes fluctuations in the generated output signal.

As will be described in detail below, the utilization of a drive signal having a raised cosine waveform may significantly lessen the magnitude of the resulting fluctuations as a result of the device's resonance frequency, since the number of higher frequencies present in the drive signal is reduced when compared to the conventional waveforms used in the prior art.

Figure 4:
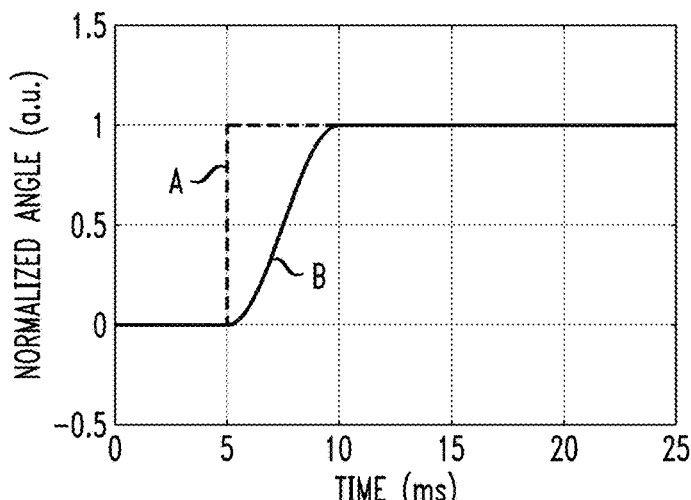
FIG. 4 is a plot of two types of electrical drive signals useful to operate a tunable optical filter, one signal (I) having a unit step response waveform and the other signal (II) exhibiting a raised cosine waveform as used in accordance with the present disclosure.

FIG. 4 contains plots of a prior art step function drive signal (plot A) and an example raised cosine drive signal (plot B), the latter used in accordance with the principles of the present disclosure as a drive signal input to a nonlinear optical device, for example to a tunable optical filter (or, perhaps, a switchable optical device). The plots show the drive signals (as a function of time) as applied to the filter (normalized over a y-axis scale from 0 to 1). The prior art step function drive signal is depicted theoretically as having an instantaneous movement between the initial and final (target) drive values (i.e., an imperceptible rise time as measured on the ms time scale of FIG. 4). This instantaneous transition in time is known to contain many high frequency components, which then unfortunately excites the filter's resonance and results in an oscillatory response.

Figure 5:
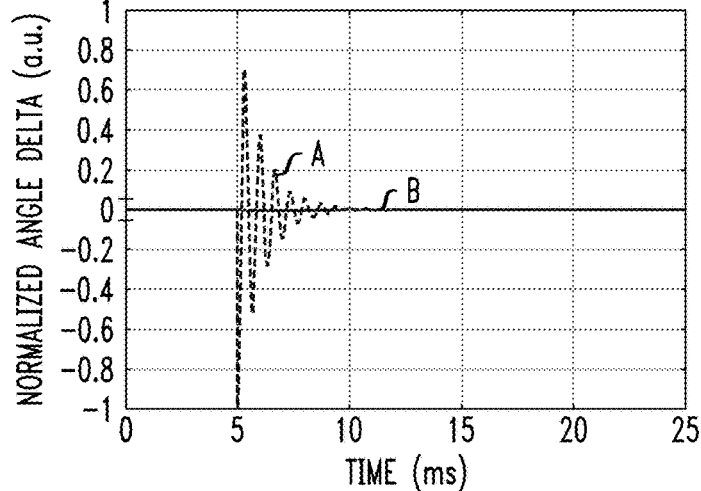
FIG. 5 contains corresponding plots of the second-order response of a tunable optical filter for both drive signal waveforms as shown in FIG. 4.

Plot A in FIG. 5 illustrates this oscillatory response of the prior art step function in terms of the deviation of the example tunable optical filter's response from the target value. The deviation is depicted in terms of the angular movements (fluctuations) of the filter over time. It is to be understood that the plots of FIG. 5 are generated from modeling results, not experimental. The filter in this example is modeled as an oscillator with a 1 kHz resonance and a damping factor $\zeta$ of 0.01.

With this understanding of the oscillatory nature of the response to a prior art step function drive signal, the improvement found by using a raised cosine drive signal (plots B in FIGS. 4 and 5) is shown. In accordance with the principles of the present disclosure, the use of a raised cosine waveform for the filter's drive signal means that there is now a perceptible transition (rise time) in the drive signal between its initial and final (target) values. In the particular illustration in plot B of FIG. 4, a 5 ms rise time is shown as the interval required for the raised cosine drive signal to reach its target value. A raised cosine waveform comprises little high frequency content and, as a result, the response of the filter exhibits very little in the way of oscillatory motion before settling into the desired angular position. Indeed, the response as shown in plot B of FIG. 5 appears to be essentially flat.

Figure 6:
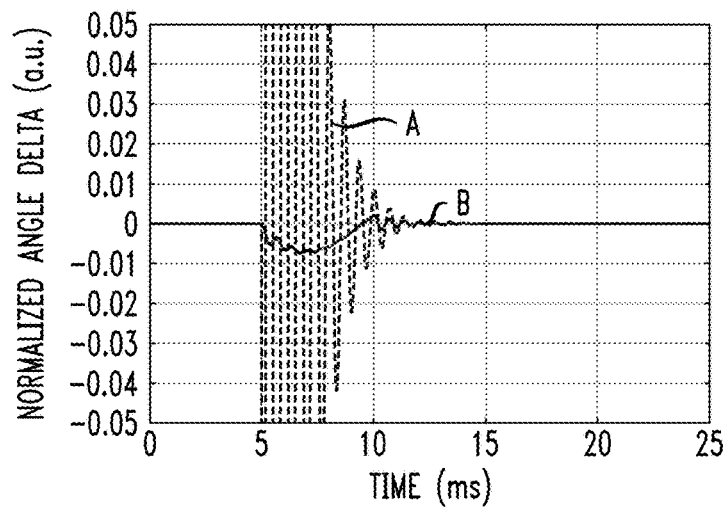
FIG. 6 is an enlarged view of a portion of the graph of FIG. 5, better illustrating the minimal oscillation present in the response to the raised cosine drive signal.

An enlargement of plots A and B in FIG. 5 (expanding the y-axis scale by two orders of magnitude) is shown in FIG. 6. This expansion is sufficient to show the very slight oscillation in plot B that is experienced in response to the raised cosine drive signal. It is considered that this minimal oscillatory behavior will be of no concern for most applications.

Figure 7:
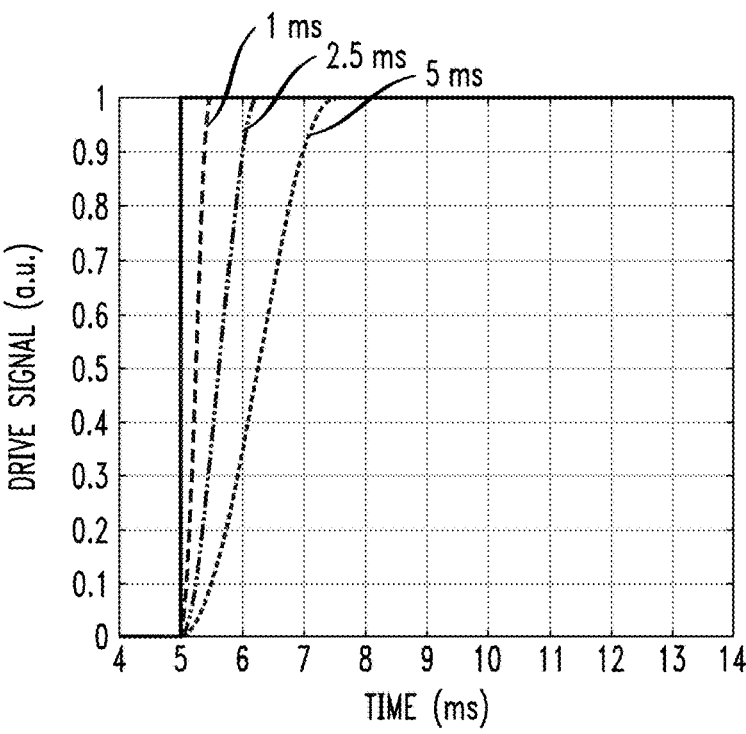
FIG. 7 shows a set of plots for selected raised cosine drive signals that may be used to control a tunable optical filter, each drive signal exhibiting a different rise time.

The use of a raised cosine with a 5 ms rise time as shown in FIG. 4 is only one example; it is contemplated that other rise times may be used as appropriate for various applications. In general, a raised cosine drive signal with faster rise times (e.g., 1 ms vs 5 ms) may exhibit some instability of the device's response before settling, but is still greatly improved over the prior art. Slower rise times (e.g., 10 ms vs 5 ms) improve the stability of the response, but at the cost of requiring a longer period of time for the device to reach its target position. FIG. 7 contains plots of three different examples of raised cosine drive signal rise times: 1 ms, 2.5 ms, and 5 ms. The prior art step function drive signal is also shown again for comparison purposes.

Figure 8:
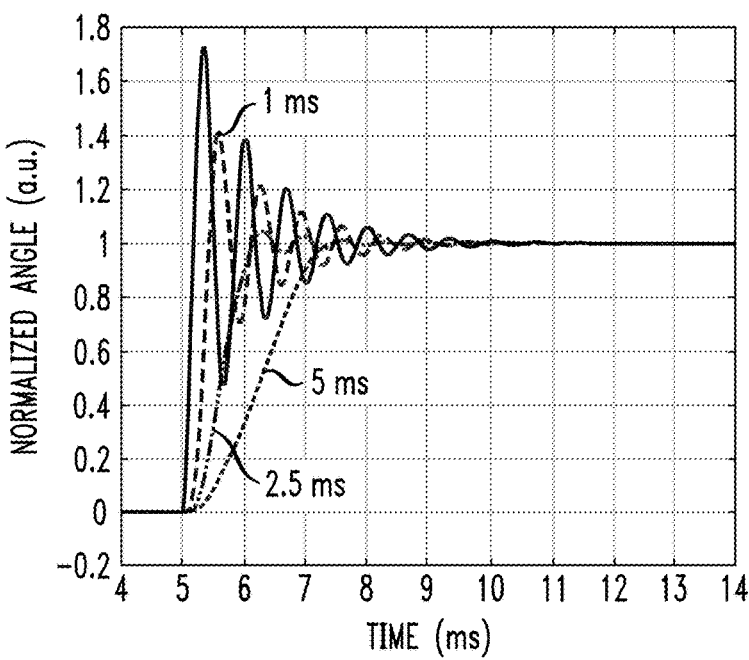
FIG. 8 is a set of second-order responses associated with the set of raised cosine drive signals of FIG. 7.

FIG. 8 contains plots similar to those of FIG. 5, and in this case depict the deviation of the response signals from the target responses for the set of three raised cosine drive signals shown in FIG. 7, and obtained under similar circumstances as described above (that is, for a filter with a 1 kHz resonant frequency and $\zeta$ of 0.01). As shown in the nonlinear device response data of FIG. 8, a raised cosine drive signal with a 2.5 ms rise time is less subject to fluctuations than the prior art step function. The faster rise time of 1 ms results in a response that is somewhat oscillatory, but again settles into position within a reasonable period of time, in this case within about 3-4 ms (i.e., 3-4 times the resonant period of the oscillator). It is to be noted that the time scale used in FIG. 8 is shorter than that of FIG. 5 (2 ms intervals as compared to 5 ms intervals) to better illustrate the change in responsivity as a function of raised cosine drive signal rise time.

Summarizing, it has been found that the use of a raised cosine waveform in the drive signal that controls the response of a nonlinear component (such as, for example, wavelength adjustment response of a tunable optical filter using a MEMS tilt mirror arrangement) allows for better control of the device's response. In the example of a tunable optical filter, the use of a raised cosine drive signal may be found to increase the stability of the system during the tuning process as compared to the step function drive signal of the prior art (with similar improvements also found with respect to other types of prior art drive signals, such as a ramp drive signal).

FIG. 9 is a plot illustrating the relationship between the rise time of a raised cosine drive signal (plotted along the x-axis) and the time that it takes for the second-order response to stabilize (plotted along the y-axis). The rise time is defined in this case as the sinusoidal half-period (measured in ms), and the stability of the device's (filter's) response is defined as the time required to reach less than ±1% of the target value. It is to be understood that the ±1% value is just one example, in general the improvement in stability is evidenced more generally by a significant reduction in oscillatory movement (e.g., values such as ±10%, ±15%, ±20% are other examples of significant reductions in oscillatory movement).

The particular data as shown in FIG. 9 indicates that an optimum half-period of the raised cosine (in terms of shortest time to reach stability) is shown to be about 2.5 ms. The second order resonance of the device is found to limit the time to stability for shorter rise time values, with the drive signal limiting the time to stability for longer rise time values. For reference, the time to stability of a step drive function is denoted by the horizontal line, indicating that raised cosines with half-period of less than 5 ms will achieve stability faster than the step function. The optimum raised cosine achieve stability about twice as fast as the step function.

As mentioned above, the same principles may be applied to the situation where it is desired to "lock" a tunable optical filter to provide an output signal fixed at a defined, target wavelength $\lambda_T$. A generalized process in accordance with the principles of the present disclosure for utilizing raised cosine drive signals to provide optimal locking of a wavelength tunable optical filter at a selected (target) output wavelength $\lambda_T$ is outlined in the flow chart of FIG. 10, with an experimental example of applying these steps is shown in the plot of FIG. 11.

The steps as outlined in FIG. 10 begin with performing an initial tuning of an optical filter to bring its operation to a value in close proximity to a target wavelength $\lambda_T$. For example, this tuning may be used to change the passband of an optical filter adjusting the filter from operation at a first, initial wavelength (for example, $\lambda_i$) to the target wavelength $\lambda_T$. Once the filter is positioned in this manner, a scanning process may then be used to find a peak power level (indicating the target wavelength $\lambda_T$) and the specific drive signal associated with the peak power.

With particular reference to FIG. 10, the initial proximate tuning is shown as step 100, which is an instruction to use a raised cosine drive signal to adjust the position of the filter (e.g., the angle of the tilt mirror in a MEMS arrangement) from an initial value associated with a prior setting to a value that is considered to be on the "near side" of the target wavelength $\lambda_T$.

Figure 11:
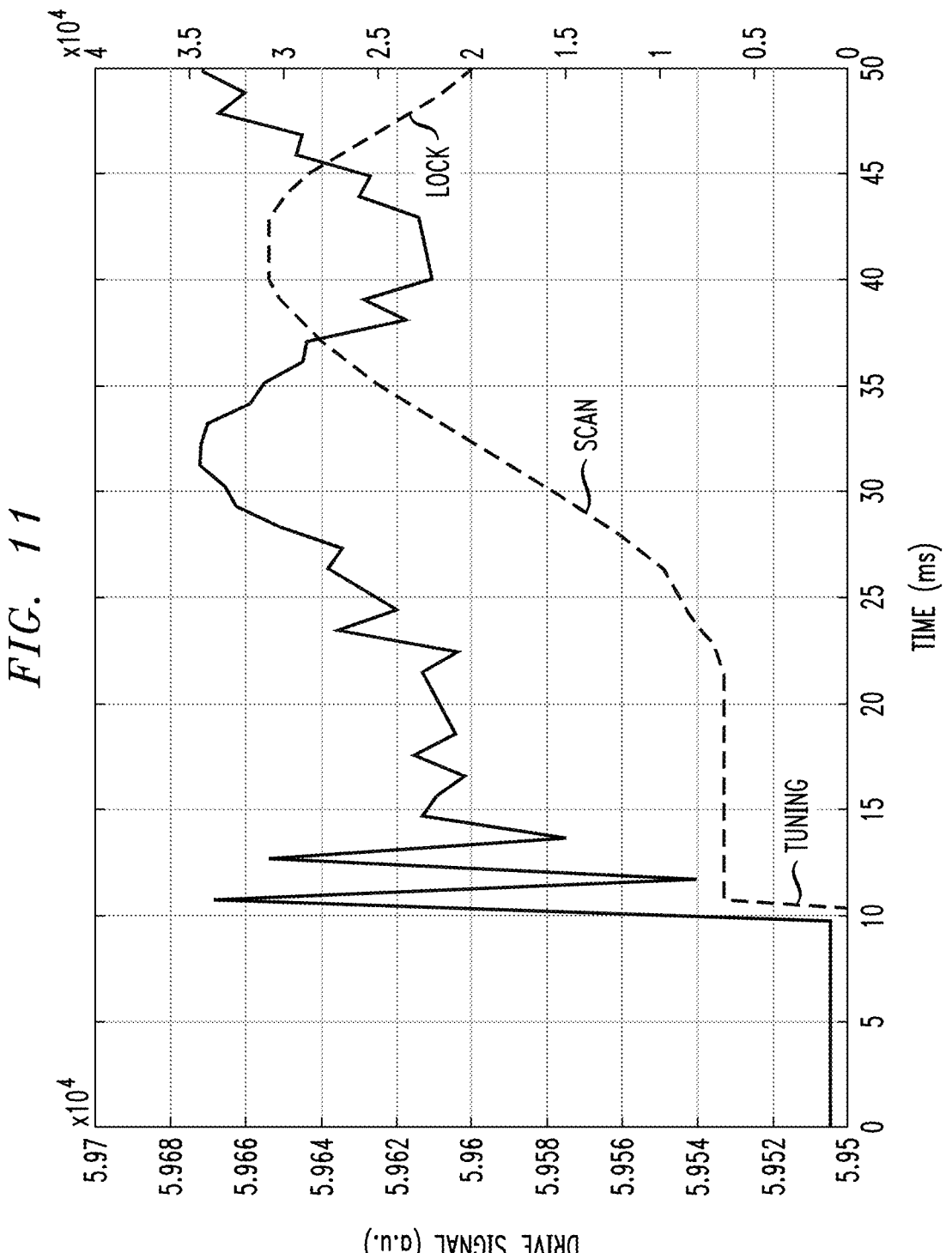
FIG. 11 is a plot of experimental measurements of a raised cosine drive signal and the corresponding optical power passing through a tunable optical filter (based on a MEMS tilt mirror), using the tuning and locking as described in the process of FIG. 10.
Figure 12:
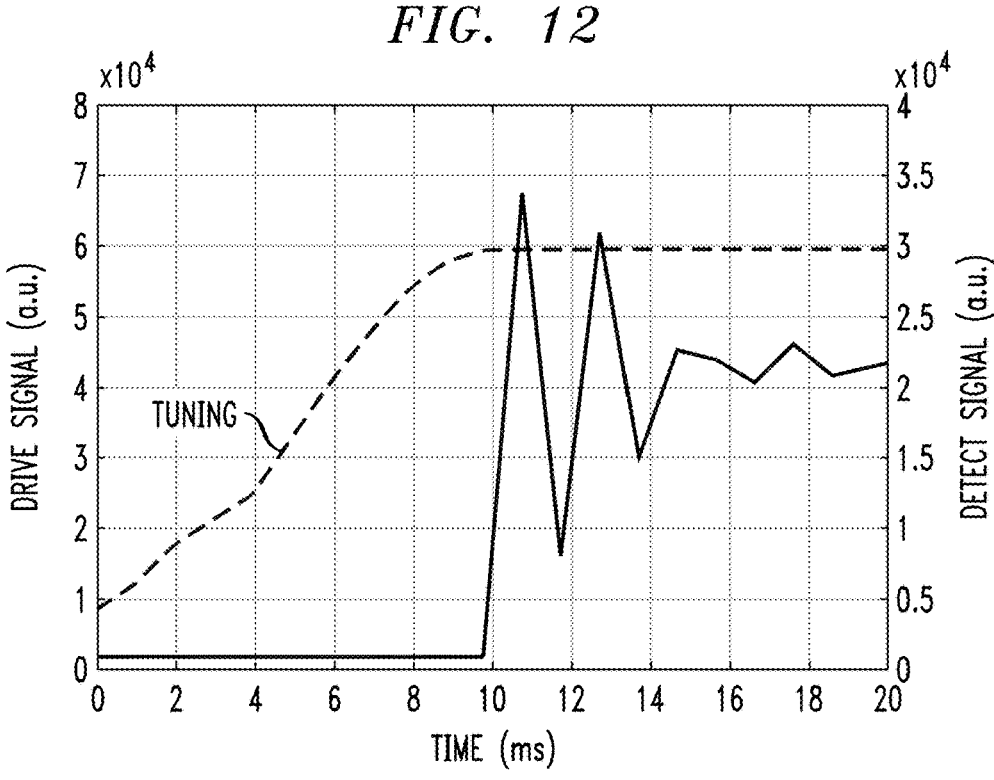
FIG. 12 is an enlarged view of the initial 20 ms of the plot of FIG. 11 to better show the voltage scale associated with the initial drive signal used to tune the filter.

An example of step 100 is represented by the first 20 ms of the example shown in FIG. 11. For purposes of clarity, FIG. 12 is an enlargement of this initial 20 ms along the timeline of FIG. 11, expanding the y-axis drive signal voltage range from the 5.95 to 5.97 (au) values of FIG. 11 to the range of 0-8e4 au. Referring to both FIGS. 11 and 12, the application of a raised cosine "tuning" drive signal with a rise time of 10 ms is shown (i.e., requiring 10 ms to reach the proximate "near side" location), followed by a dwell time at this drive signal value. The dwell time is used to allow for the filter (mirror) to settle into this new position. In the example shown in FIG. 12, a 10 ms dwell time interval was found to be sufficient to settle the filter's position to within the example value of ±1% of the final location. Also illustrated in FIGS. 11 and 12 is the response signal (illustrative of the oscillatory movements of the tilt mirror during its change in position, and particularly illustrating the settling of the response by the end of the dwell period.

Returning to the flowchart of FIG. 10, once the initial tuning step is completed, the locking process proceeds to perform a scanning step (shown as step 110 in FIG. 10). In particular, the scanning step uses a raised cosine "scanning" drive signal to control the movement of the filter (e.g., tilt mirror) so as to scan across a defined wavelength interval $\Delta\lambda$ that includes the selected target wavelength $\lambda_T$. The scan is performed in the presence of an applied optical signal, with the associated photodetector used to measure the output power as the scan proceeds. By maintaining an association between the drive signal value (voltage or current) and power level, an "optimal" drive signal is defined as the value associated with the maximum output power.

An example the scanning process is depicted further along the timeline of FIG. 11, in this example along the time span between 20 ms and 40 ms. Compared to the initial tuning step (which is shown in FIG. 12 as using a drive signal with a relatively large change in magnitude as necessary to move the filter through a larger angular change from one wavelength setting to another), the scanning process is performed using a raised cosine drive signal with a much smaller change in voltage as shown in FIG. 11. The smaller drive signal range for scanning is based upon the presumption that the changes in output power in the vicinity of the peak are relatively slight and therefore very sensitive to changes in the drive signal. In the particular example as shown in FIG. 11, the scanning begins with the drive signal at the level found in the initial tuning step, thereafter using a raised cosine signal with a rise time on the order of about 20 ms to move the filter through the wavelength interval $\Delta\lambda$. As the drive signal is increased, a photodetector included with the filter is used to measure the associated optical output power at a set number of sample locations within the wavelength interval $\Delta\lambda$.

With reference back to the flowchart of FIG. 10, the next step (step 120) in the locking process is the evaluation of the collected power data to determine the drive signal associated with the highest recorded power. The position of the filter element (tilt mirror, for example) associated with this specific drive signal value is then defined as the "optimum" drive signal for target wavelength $\lambda_T$.

Figure 13:
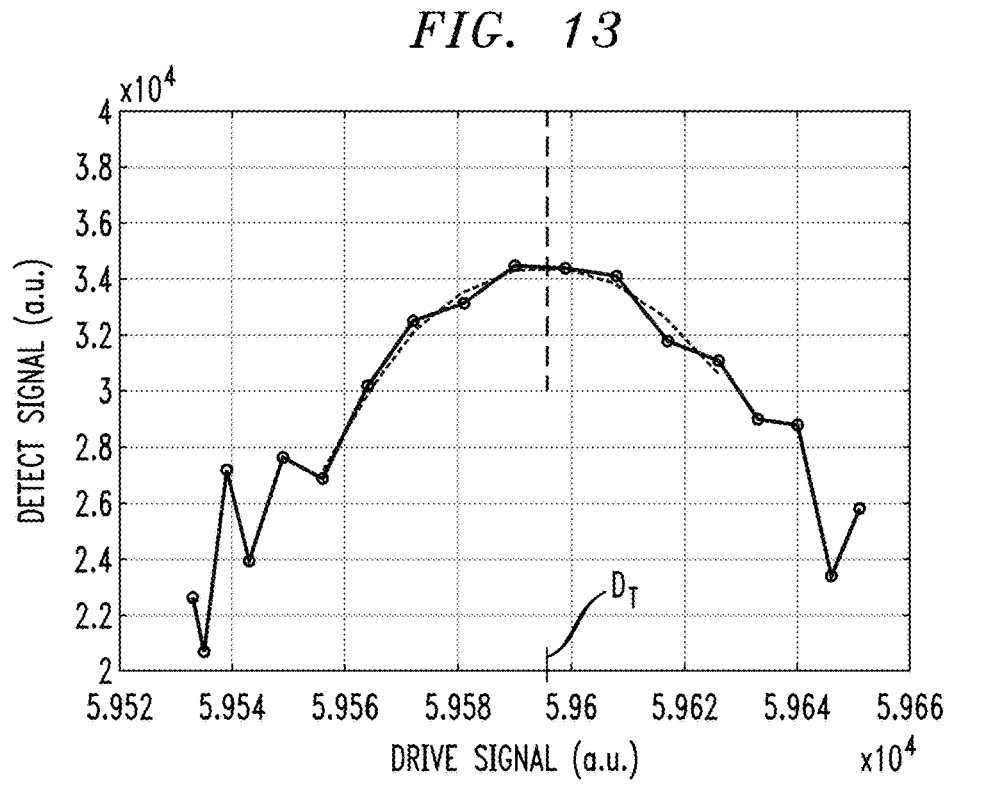
FIG. 13 illustrates the use of a parabolic fit to scan data from FIG. 12 and used to identify an optimum drive voltage that achieves maximum optical power of the filtered signal.

FIG. 13 is a plot of the optical power data collected during this scan as a function of drive signal value, and is one example of a methodology for performing step 120. An optimal drive signal value may be derived from an analysis of this plot, in this case by use of a parabolic fit (as shown). In general, the number of samples used during the scan is a factor in determining the type of fit and/or approximation that should be used to arrive at the optimal drive signal value. For purposes of illustration, FIG. 13 denotes that a drive signal $D_T$ is associated with the maximum output power. Therefore, the drive signal $D_T$ is determined as optimum for "locking" with target wavelength $\lambda_T$.

Returning to the flow chart in FIG. 10, the final step 130 in the locking process is the movement of the filter into the position associated with target wavelength $\lambda_T$. In accordance with the disclosed principles, a raised cosine drive signal is again used to make this final adjustment in the position of the filter. This final movement is also shown in FIG. 11, where a (negative) rise time (or "fall time") of 10 ms (from 40 ms to 50 ms) is used to reach this value.

It is to be understood that the particular examples of raised cosine rise times and filter characteristics included above are only examples specified for the purpose of understanding the presented principles. In a larger sense, the disclosure is directed to the recognition that use of a raised cosine waveform for the drive signal applied to a tunable nonlinear optical filter addresses the instability problems associated with the high frequency components of conventional drive signals (either step functions or ramps). A raised cosine drive signal has the lowest possible frequency components that can drive the filter to a target position while avoiding the oscillatory nature of the filter response associated with prior art drive signals. The control of a tunable optical filter using raised cosine tuning and locking results in reduced oscillation and faster settling times when compared to the prior art. That is, the use of raised cosine waveforms in the drive signal minimizes the total time to tune and lock an optical filter onto a target output wavelength, while minimizing the instability caused by the filter's nonlinear time-domain response.

Moreover, the described features, structures, or characteristics of a wavelength tunable optical filter may be combined in any suitable manner in one or more embodiments that illustrate the aspects of this disclosure. One skilled in the relevant art will realize that the principles of the present disclosure may be practiced without one or more of the specific details, or with other methods, components, or the like. Thus, while the foregoing examples are considered to be illustrative of the disclosed principles, it is apparent to those skilled in the art that numerous modifications in form, usage, and details of implementation may be made without the exercise of inventive faculty, and without departing from the principles and concepts as presented in this disclosure. Accordingly, it is not intended that the subject matter of this disclosure be limited, except as by the claims set forth below.

What is claimed is:

1. A tunable optical filter, comprising:
a nonlinear optical filter component exhibiting a nonlinear time domain response, the optical filter component responsive to a multi-wavelength input optical signal and an electrical drive signal, the electrical drive signal for tuning an output wavelength of the tunable optical filter from an initial wavelength value to a selected target wavelength value, the nonlinear filter component exhibiting an oscillatory response to the electrical drive signal; and

a control source for providing a raised cosine signal as the electrical drive signal input to the nonlinear optical filter component, the raised cosine signal exhibiting a defined rise time associated with minimizing the extent of the oscillatory response of the nonlinear filter component;

wherein the nonlinear filter component comprises a component exhibiting an under-damped second-order oscillatory response approximated by a transfer function defined as:

$$H(\omega) = \frac{1}{1 + 2j\omega\zeta - \omega^2},$$

where $\zeta$ is defined as a damping factor of the transfer function and exhibits a value less than unity.

2. The tunable optical filter as defined in claim 1, wherein the nonlinear filter component comprises a MEMS tilt mirror.

3. The tunable optical filter as defined in claim 1, wherein the rise time of the raised cosine drive signal is selected to reduce oscillations to a defined percentage of the selected target wavelength value during a defined settling time period, the defined settling time period less than the settling time period associated with a step function waveform drive signal.

4. A switchable optical device, comprising:

an optical component for controlling switching functions between one or more input signals and one or more output signals as a function of an applied electrical control signal, the optical component exhibiting a nonlinear response to the applied electrical control signal; and a control source for providing a raised cosine signal as the electrical control signal input to the component, the raised cosine signal exhibiting a defined rise time associated with minimizing fluctuations in the nonlinear response of the component;

wherein the optical component exhibits an under-damped second-order oscillatory response approximated by a transfer function defined as:

$$H(\omega) = \frac{1}{1 + 2j\omega\zeta - \omega^2},$$

where $\zeta$ is defined as a damping factor of the transfer function and exhibits a value less than unity.

5. The switchable optical device as defined in claim 4, wherein the optical component comprises a MEMS tilt mirror.

6. The switchable optical device as defined in claim 4, wherein the rise time of the raised cosine drive signal is selected to reduce fluctuations to a value of less than a defined percent of the target during a defined settling time period, the defined settling time period less than the settling time period associated with a step function waveform drive signal.

7. A method of wavelength tuning an optical filter, comprising:

determining a nonlinear response of an optical wavelength filtering element utilized for wavelength tuning;

selecting a target wavelength for use as the output wavelength from the optical filter;

determining a target electrical drive signal associated with the selected target wavelength, based on the nonlinear response of the optical wavelength filtering element; and applying a raised cosine drive signal to the optical wavelength filtering element to tune the wavelength of the optical filter from an initial value to the selected target wavelength;

where a rise time of the raised cosine drive signal is selected to reach the target wavelength with an oscillation less than a defined percentage of the target in the output signal.

8. The method as defined in claim 7, wherein the optical wavelength filtering element includes a MEMS tuning mirror and the determined nonlinear response takes the form of a highly under-damped second order oscillation.

9. A method of maintaining a selected output wavelength for a tunable optical filter, comprising:

determining a nonlinear response of an optical wavelength filtering element utilized for wavelength tuning;

selecting a target wavelength for use as the output wavelength from the optical filter;

applying a first raised cosine drive signal to the optical wavelength filtering element for tuning the wavelength of the optical filter from an initial value to a value near the selected target wavelength;

applying a second raised cosine drive signal to the optical wavelength filtering element for scanning an optical output wavelength across a wavelength band including the target wavelength and recording an optical output power at identified wavelengths within the wavelength band;

determining a final raised cosine drive signal as associated with a recorded maximum output power; and applying a third raised cosine drive signal to the optical wavelength filtering element to tune the optical filter to the maximum output power value.

10. The method as defined in claim 9, wherein the step of determining a final raised cosine drive signal includes:

plotting output power as a function of drive signal value;

applying an approximation curve to the plotted output power; and finding a maximum value of the approximation curve; and defining the maximum value as the optimum drive signal for maintaining the optical filter at the selected target wavelength.

11. A tunable optical filter, comprising:

a nonlinear optical filter component exhibiting a nonlinear time domain response, the optical filter component responsive to a multi-wavelength input optical signal and an electrical drive signal, the electrical drive signal for tuning an output wavelength of the tunable optical filter from an initial wavelength value to a selected target wavelength value, the nonlinear filter component exhibiting an oscillatory response to the electrical drive signal; and a control source for providing a raised cosine signal as the electrical drive signal input to the nonlinear optical filter component, the raised cosine signal exhibiting a defined rise time associated with minimizing the extent of the oscillatory response of the nonlinear filter component;

wherein the rise time of the raised cosine drive signal is selected to reduce oscillations to a defined percentage of the selected target wavelength value during a defined settling time period, the defined settling time period less than the settling time period associated with a step function waveform drive signal.

12. A method of wavelength tuning an optical filter, comprising:

determining a nonlinear response of an optical wavelength filtering element utilized for wavelength tuning;

selecting a target wavelength for use as the output wavelength from the optical filter;

determining a target electrical drive signal associated with the selected target wavelength, based on the nonlinear response of the optical wavelength filtering element; and applying a raised cosine drive signal to the optical wavelength filtering element to tune the wavelength of the optical filter from an initial value to the selected target wavelength;

wherein the optical wavelength filtering element includes a MEMS tuning mirror and the determined nonlinear response takes the form of a highly under-damped second order oscillation.

\* \* \* \* \*